United States Patent [19]

Lippman et al.

[11] Patent Number: 5,439,540
[45] Date of Patent: Aug. 8, 1995

[54] METHOD AND APPARATUS FOR APPLYING SHEET MATERIAL TO A BASE SURFACE

[75] Inventors: Glen W. Lippman, Broomfield; James S. Rezny, Arvada; James F. Coss, Lafayette, all of Colo.

[73] Assignee: TechnoCorp Inc., Northglenn, Colo.

[21] Appl. No.: 947,138

[22] Filed: Sep. 18, 1992

[51] Int. Cl.⁶ ............................................. B32B 31/20
[52] U.S. Cl. ..................... 156/71; 156/322; 156/499; 156/577; 156/579
[58] Field of Search ............... 156/71, 157, 499, 502, 156/543, 544, 574, 577, 579, 322

[56] References Cited

U.S. PATENT DOCUMENTS

| | | | |
|---|---|---|---|
| 4,146,419 | 3/1979 | Neidhart | 156/391 |
| 4,354,893 | 10/1982 | Kugler et al. | 156/497 |
| 4,447,288 | 5/1984 | Seaman | 156/574 |
| 4,460,433 | 7/1984 | Boyd | 156/574 |
| 4,504,352 | 3/1985 | Meyer | 156/499 |
| 4,533,423 | 8/1985 | Johnson et al. | 156/359 |
| 4,743,332 | 5/1988 | Black | 156/359 |
| 4,806,194 | 2/1989 | Wald | 156/379.8 |
| 4,872,941 | 10/1989 | Lippman | 156/497 |
| 4,894,112 | 1/1990 | Lippman | 156/308.4 |
| 4,913,772 | 4/1990 | Taylor et al. | 156/499 |

FOREIGN PATENT DOCUMENTS

| | | |
|---|---|---|
| 473786 | 12/1975 | U.S.S.R. |
| 1375764 | 2/1988 | U.S.S.R. |

*Primary Examiner*—David A. Simmons
*Assistant Examiner*—J. Sells
*Attorney, Agent, or Firm*—Brian D. Smith

[57] ABSTRACT

Method and apparatus for heating and applying sheet material to an supported base surface are disclosed. The apparatus includes a mobile frame for transporting, supporting and permitting a roll of sheet material to be unrolled. The apparatus further includes a heating platen for heating the sheet material along its width and for heating the supported base surface. Pressure rollers are also disclosed for pressing the sheet material against the heating platen to facilitate heating thereof and to the base surface to facilitate welding. In addition, the apparatus includes a release mechanism for pivoting the heating platen and the pressure means in unison to and from operating and release positions. In the release position, the sheet material is separated or spaced from the heating platen to prevent it from being overheated thereby and possibly ignited.

24 Claims, 3 Drawing Sheets

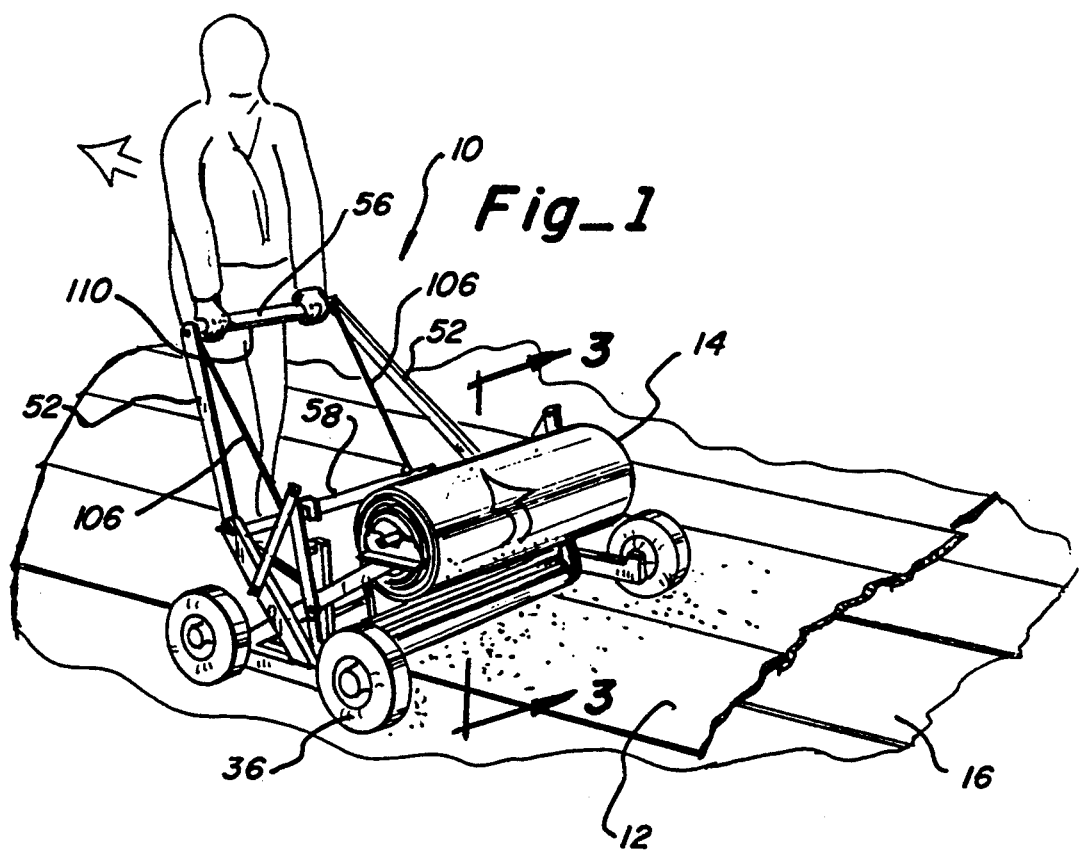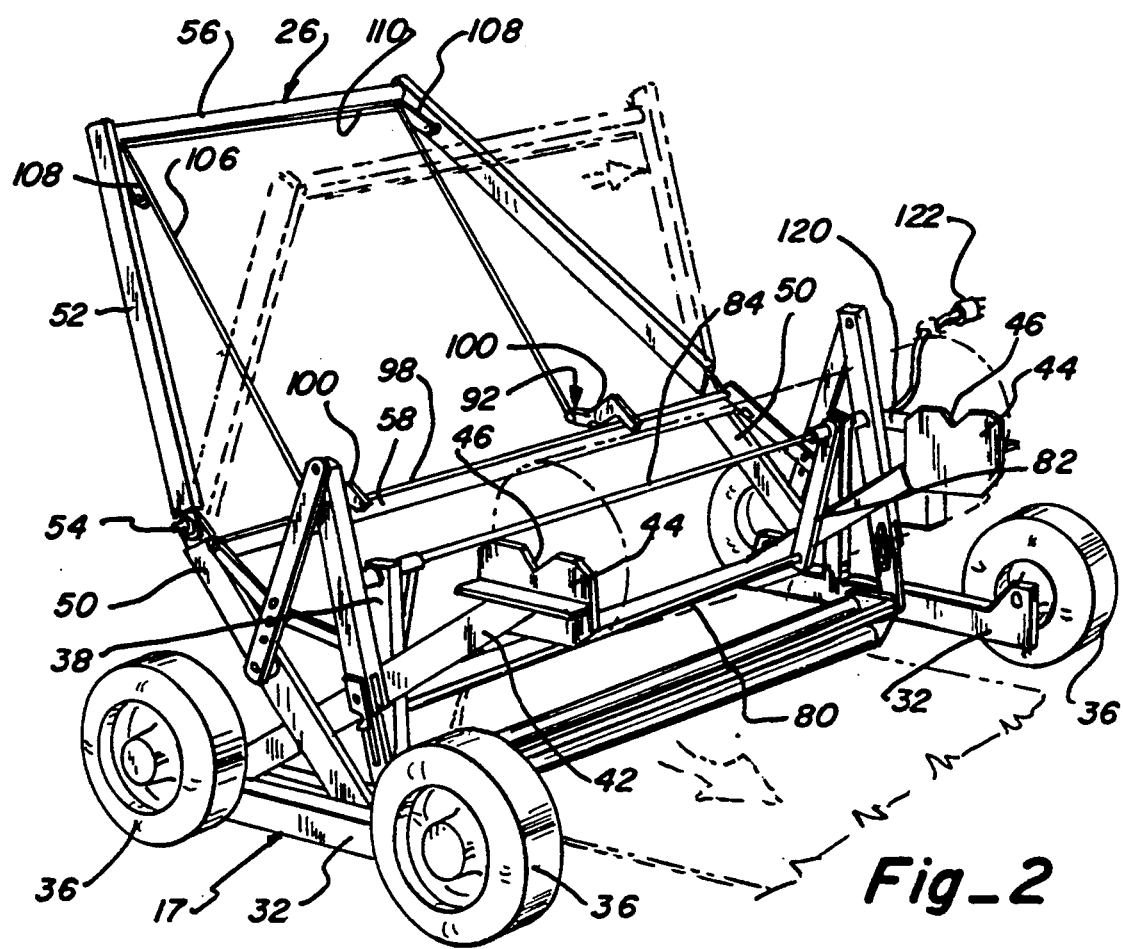

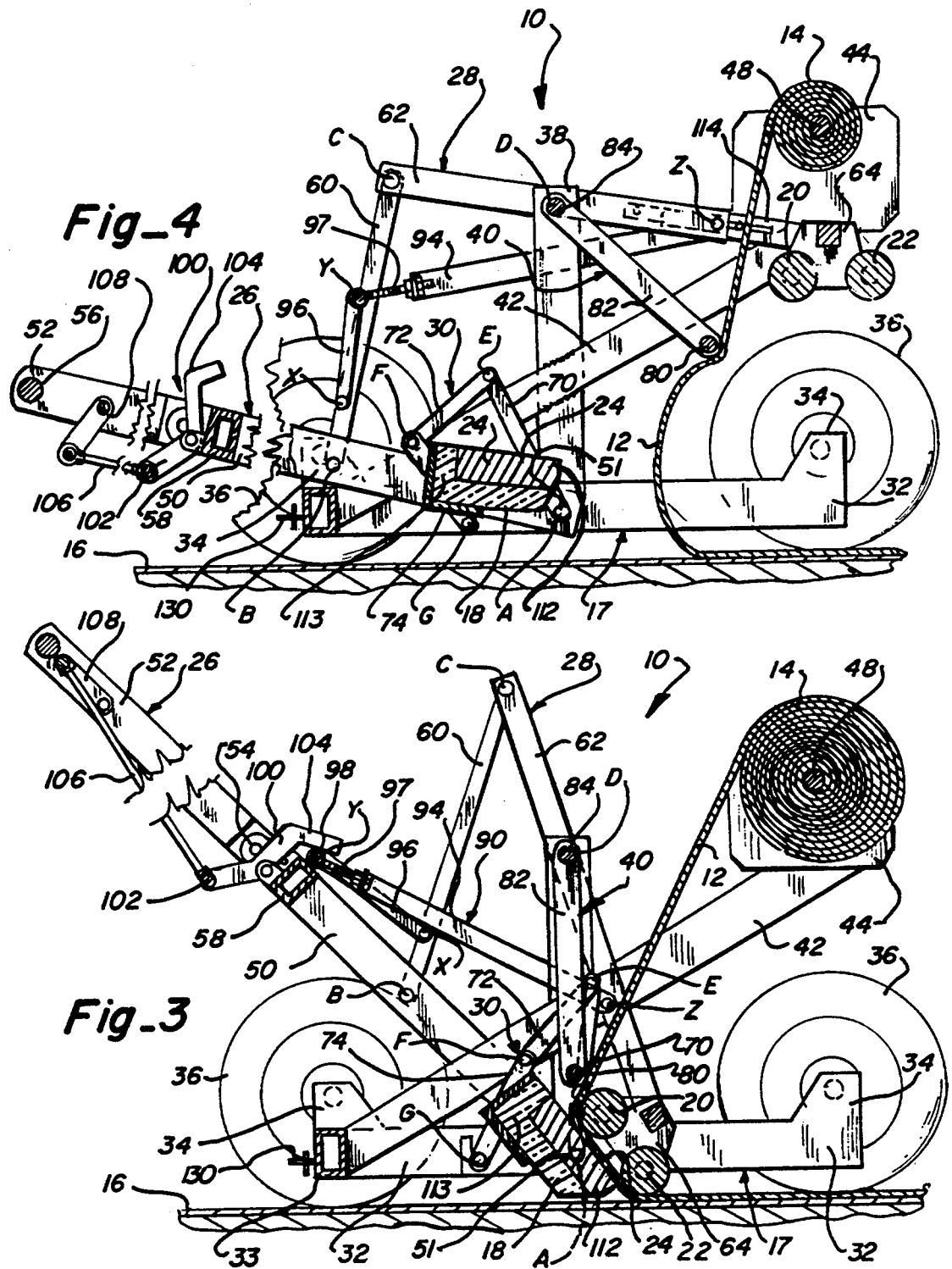

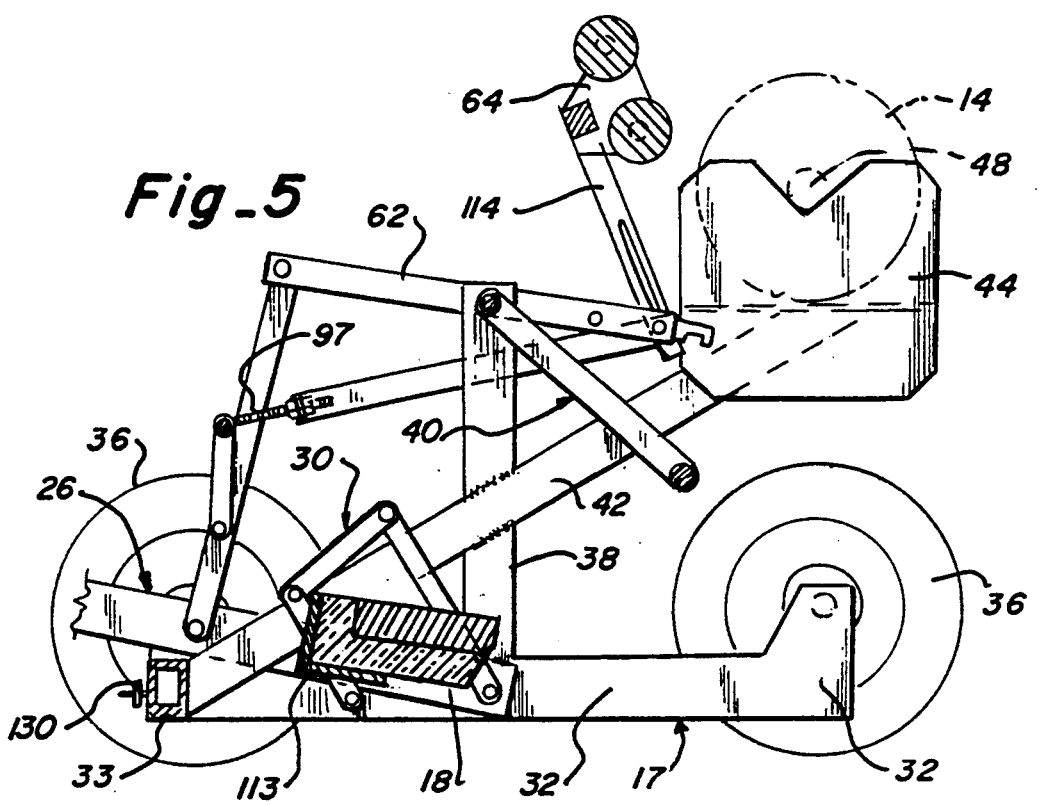

METHOD AND APPARATUS FOR APPLYING SHEET MATERIAL TO A BASE SURFACE

TECHNICAL FIELD

The present invention relates to devices for applying sheet material such as thermoplastic sheet material and other non-plastic containing sheet materials to a surface such as the roof of a building, landfill or overlapping a base sheet of the same sheet material. More particularly, the invention relates to an apparatus which not only applies the roofing material to the surface but also simultaneously heats the material and the surface to which it is being applied. In addition, the present invention provides a novel means for separating the heating element from the sheet material and the surface to which the material is being applied, thereby preventing the sheet material and surface from overheating and possibly igniting.

BACKGROUND ART

The prior art is replete with apparatus for applying rolled sheet material to a surface. The art is also replete with apparatus for welding or bonding thermoplastic sheets together and along their overlapping edges. For example, U.S. Pat. No. 4,806,194 to Wald and U.S. Pat. No. 4,354,893 to Kugler, et al. disclose apparatus for heating and applying rolled sheet material to a surface such as a roof. Russian Patent Nos. 473,786 and 1,375,764 also disclose apparatus for heating and applying sheet material to a surface such as a roof. U.S. Pat. No. 4,460,433 to Boyd discloses non-heating apparatus using a pressure roller to apply or press thermoplastic sheet to a surface. The outer shell of the pressure roller in Boyd is constructed out of a flexible material which deforms in a direction perpendicular to the roof but not in any other direction to apply uniform pressure on the sheet. U.S. Pat. No. 4,913,772 to Taylor, et al. discloses an apparatus for welding a strip over abutting or overlapping edges of individual thermoplastic sheets to seal the sheets together. The machine uses both heat and pressure to weld the strip to the abutting or overlapping edges. U.S. Pat. No. 4,894,112 to the present inventor discloses a method and apparatus comprising a hand held device for joining or welding the overlapping edges of thermoplastic sheet material together. U.S. Pat. No. 4,872,941 also to the present inventor, discloses a self-propelled apparatus for welding thermoplastic sheets together.

While all of the above mentioned patents disclose apparatus which undoubtedly perform as intended there still remains a need for a welding apparatus which is not only capable of heating and applying a roll of sheet material to an supported surface but which is also capable of preventing the sheet material from overheating. Overheating can occur if the heating elements remain in contact with the sheet material after the operator stops applying the sheet material to the supported surface. To prevent such overheating, it is necessary to either shut off the source of heat or somehow separate the sheet material from the heating element.

A need also exists for a welding device which additionally heats the supported surface to which the sheet material is being applied so that a better bond or weld is formed between the sheet and surface.

A need further exists for a welding device as described above which is easily transported, lightweight and relatively inexpensive when compared to other commercially available welding devices.

DISCLOSURE OF THE INVENTION

The present invention addresses the aforementioned concerns by providing method and apparatus for heating and applying sheet material such as thermoplastic sheet material in rolled or unrolled form to a base surface which additionally prevents the sheet material from overheating when the welding process of applying the sheet to the surface jams or is halted.

The apparatus of the invention comprises a mobile frame or frame means for transporting, supporting and permitting a roll of sheet material to be unrolled. In addition, a heating platen or wedge for heating the sheet material along its width (preferably as it is unrolled) is also provided. Pressure means, preferably in the form of pressure rollers, are also provided for pressing the sheet material against the heating platen to facilitate heating of the sheet material. One of the pressure rollers also preferably presses the sheet material against the base surface. Finally, a release mechanism or means is provided for moving the heating platen relative to the pressure means to prevent the sheet material from contacting the heating platen and being overheated thereby. The release means is preferably activated by releasing a handle of the apparatus which when released drops or falls due to the action of gravity which, in turn, activates the release means. This release means is preferably activated when an operator using the apparatus stops pulling it, thereby stopping or halting the process of applying (welding) the sheet to the supported base surface.

In a preferred embodiment, the heating platen is capable of being moved to a position relative to the frame in which the supported base surface is heated as the sheet material is being applied. In most situations, the supported base surface is already covered by a supported base sheet of material. Accordingly, the heating platen will heat the base sheet as it heats and applies the top sheet which enhances bonding between the sheets.

The method of the present invention includes providing a welding apparatus as described above and loading it with sheet material so that the sheet material is positioned between the heating platen and the pressure means. The sheet material is then heated along its width by passing it between the heating platen and the pressure means when the pressure means is in a position pressing the sheet material against the heating platen.

Finally, the method includes a step of separating the sheet of material from the heating platen by moving the heating platen relative to the pressure means so that the sheet is prevented from contacting and being overheated by the heating platen. As mentioned above, this step is implemented when an operator stops pulling the welding apparatus and releases the handle.

A preferred method of the invention also includes the step of heating the supported base surface to enhance welding or bonding of the sheet material to the supported surface.

BRIEF DESCRIPTION OF THE DRAWINGS

The invention will be more readily understood by reference to the accompanying drawings wherein like reference numerals indicate like elements throughout the drawing figures, and in which:

FIG. 1 is a perspective view illustrating an operator using a welding apparatus of the present invention to apply a roll of sheet material to an underlying layer of sheet material.

FIG. 2 is a perspective view of the welding apparatus illustrated in FIG. 1 which shows the welding apparatus in its operating position.

FIG. 3 is a cross-sectional view taken along the lines 3—3 of FIG. 2.

FIG. 4 is a cross-sectional view similar to that of FIG. 3 showing, however, the welding apparatus in its release position.

FIG. 5 is a partial cross-sectional view similar to that illustrated in FIG. 4 showing, however, the position of the pivot arm ends connected to the pressure rollers after they have been pivoted to a loading position which enables a new roll of sheet material to be loaded into the welding apparatus.

FIG. 6 is a partial plan view of the top of the welding apparatus illustrated in FIG. 1.

BEST MODE FOR CARRYING OUT THE INVENTION

FIGS. 1 through 6 illustrate a welding device or apparatus 10 of the present invention for heating and applying a sheet 12 from a roll 14 of sheet material to a base surface 16. Device 10 generally includes a mobile frame 17, a heating platen 18, a pair of pressure rollers 20 and 22 and a release mechanism or means (not numbered) for pivoting the heating platen and pressure rollers in unison to and from operating and release positions. In the release position illustrated in FIG. 4, the heating platen and pressure rollers are separated from each other so that sheet 12 located therebetween is prevented from contacting and being overheated by the heating platen. FIG. 3 illustrates device 10 in its operating position in which pressure rollers 20, 22 are pressing sheet 12 against a surface 24 of heating platen 18.

The release mechanism includes a handle 26 and first and second pivoting linkage mechanisms or means 28 and 30, respectively, for moving (actually pivoting) pressure rollers 20, 22 and heating platen 18 in unison to and from their operating and release positions which are illustrated in FIGS. 3 and 4, respectively. As previously mentioned, when device 10 is in its release position, sheet 12 is prevented from contacting heating platen 18 and thereby prevented from being overheated thereby which can occur when an operator stops pulling (i.e. moving) device 10, even temporarily, in the direction of the arrow indicated in FIG. 1.

In general, frame 17 supports roll 14 permitting it to be unrolled as an operator pulls device 10 in what appears to be a backwards direction as illustrated by the arrow in FIG. 1. Frame 17 includes a pair of horizontal members 32 which extend in a direction parallel to the direction in which device 10 is pulled and are connected by a cross support member 33 at the ends of members 32 which face the operator. Horizontal members 32 also define wheel mounts 34 at their opposite ends (not numbered) upon which are mounted wheels 36 for enabling device 10 to be rolled or propelled on surface 16. Frame 17 also includes a pair of upright supports 38 which are rigidly attached at their lower ends (not numbered) to frame supports 39 which run parallel to horizontal members 32 but are spaced therefrom (See FIG. 6) and which are rigidly attached at their ends facing the operator to cross support member 33. As will be explained in more detail below, upright supports 38 support first pivoting linkage mechanism 28 and a push-a-way bar 40 in pivotal fashion, the connection and operation of which will be described in more detail below.

Frame 17 also includes a pair of diagonal cross-supports 42 which are rigidly attached at their lower ends to cross support 33 and at their midsections to upright supports 38, as is illustrated in FIG. 4. As also illustrated in FIG. 4 and best illustrated in FIG. 2, a pair of support brackets 44 are rigidly attached to the upper ends (not numbered) of diagonal cross-supports 42. Each support bracket 44 defines a V-shaped notch 46 for holding a support bar 48 which is inserted through the conventional hole of a roll 14 of sheet material to support the roll. Support bar 48 may or may not be configured with end means such as collars (not shown) to contain bar 48 within support brackets 44.

Handle 26 includes a pair of lower sides 50 which are pivotally attached to frame 17 by a pair of short pivot rods 51 about a fixed axis A as is best illustrated in FIGS. 3 and 4. Handle 26 also includes a pair of upper sides 52 which are pivotally attached to lower sides 50 at pivotal attachments 54, one of which includes a locking mechanism. Both sides 50 and 52 are normally in a locked or fixed position relative to each other when welding device 10 is in use. However, when not welding pivotal attachments 54 can be unlocked which allows handle sides 52 to be pivoted upwardly to another locked position which enables device 10 to be more easily transported and stored. (See FIG. 2) To transport device 10 in this position, handle 26 is first released so that it drops to its release position shown in FIG. 4. Handle sides 52 are then pivoted upwardly to the position shown in phantom in FIG. 2. The operator can then transport the device by pressing downwardly on handle 26 so that the device can be propelled and turned on the set of wheels facing the operator.

Handle 26 also includes a pair of first and second cross-bars 56 and 58, respectively, as is illustrated in FIG. 1. First cross-bar 56 is grasped by an operator using device 10 to pull device 10 in the direction of the arrow indicated in FIG. 1. Second handle cross-bar 58 provides support and rigidity for handle 26 and, additionally, is used to lock device 10 in its operating position, the locking of which will be described in more detail below.

First pivoting linkage mechanism 28 pivots rollers 20, 22 between their release position illustrated in FIG. 4 and their operating position illustrated in FIG. 3. Linkage mechanism 28 includes a pair of first and second pivot arms 60, 62, respectively, each of which has first and second ends (not numbered). As illustrated in FIGS. 3 and 4, the first ends of first pivot arms 60 are pivotally connected to the mid-sections of lower handle sides 50 about a first floating axis B. The second or other ends of pivot arms 60 are pivotally connected to the first ends of second pivot arms 62 about a second floating axis C, again as best illustrated in FIGS. 3 and 4. The second or other ends of pivot arms 62 are connected to a pair of adjustable support brackets 64 upon which are rotatably mounted rollers 20, 22. Pivot arms 62 are also rigidly attached at their mid-sections to the ends of a pivot bar 84 at the upper ends of upright supports 38 for pivotal movement about a fixed axis D, as best illustrated in FIG. 2.

While the exact dimensions of pivot arm 60, 62 are not disclosed herein, those skilled in the art will appreciate that the pivot arms dimensions and their pivotal connections to handle sides 50 and upright 38 are such that they cooperate with each other to pivot pressure rollers 20, 22 into alignment with heating platen 18 when handle 26 is moved from its release position illustrated in FIG. 4 to its operating position illustrated in FIG. 3.

Second pivoting linkage 30 for moving heating platen 18 between its operating and release positions illustrated in FIGS. 3 and 4 includes a pair of first, second and third links 70, 72 and 74, respectively, all of which have first and second ends (not numbered). The first ends of first links 70 are rigidly attached to previously mentioned pivot rods 51 (which, in turn, are rigidly attached to the lower ends of handle 26) so that links 70 are capable of being pivoted relative to frame 17 about previously mentioned fixed axis A when handle 26 is moved upwardly and downwardly to and from its operating and release positions. The second ends of first links 70 are pivotally attached to the first ends of second links 72 about a third floating axis identified by the letter E. The second ends of second link 72 are pivotally attached to the first ends of third links 74 about a fourth floating axis identified by the letter F. The third links 74 are rigidly attached to the opposite ends of heating platen 18 and the second ends of the third links are pivotally attached to frame 17 about a third fixed axis identified by the letter G.

Those skilled in the art reviewing FIGS. 3 and 4 will appreciate that heating platen 18 actually pivots about fixed axis G as it is pivoted between its release and operating positions. Those skilled in the art will also appreciate that the first, second and third links 70, 72 and 74 are also dimensioned and pivotally connected to frame 17 so that they cooperate with each other and with handle 26 to pivot the heating platen to and from its release and operating positions as handle 26 is moved to and from its operating positions, again as illustrated in FIGS. 3 and 4.

As previously mentioned, push-away bar means or mechanism 40 pushes sheet 12 away from heating platen 18 when device 10 is moved from its operating to its release position, as illustrated in FIG. 4. As best illustrated in FIG. 2, push-away bar means 40 includes a push-away bar 80 and a pair of side bars 82 which pivotally attach the push-away bar to upright supports 38 for pivotal movement about fixed axis D. As also best illustrated in FIG. 2, the push-away bar mechanism further includes pivot bar 84 which is rigidly connected at its opposite ends (not numbered) to side bars 82 and pivot arms 62 for pivotal movement relative to upright supports 38 about axis D. It will be appreciated that movement of handle 26 between its release and operating positions pivots push-away bar 80 to and from its release and operating positions. In addition, it will be appreciated that pivot bar 84 provides support to not only the push-away bar mechanism but the entire welding device 10 as well.

Device 10 is also provided with a releasable locking mechanism or means (not numbered) for releasably locking pressure rollers 20, 22 against heating platen 18 to facilitate heating of sheet 12. The releasable locking means assures that rollers 20, 22 will apply uniform pressure to sheet 12 against surface 24 of heating platen 18 as the operator pulls device 10 in the direction indicated by the arrow in FIG. 1. If the releasable locking mechanism were not provided, uniform pressure could not be applied to sheet 12 against heating platen 18 since it is physically impossible for an operator pulling device 10 to apply uniform pressure to sheet 12 via rollers 20, 22 as he or she pulls the device. Accordingly, by providing a releasable locking mechanism, the application of uniform pressure is facilitated which facilitates uniform heating of sheet 12.

The releasable locking means is releasable in the sense that it is capable of being quickly unlocked to enable an operator to release and drop handle 26 which causes the handle to move from its operating position illustrated in FIG. 3 to its release position illustrated in FIG. 4. In the embodiment illustrated, after unlocking the releasable locking mechanism and letting go of the handle, gravity causes handle 26 to move (actually fall) from its operating position to its release position thereby moving the components, i.e. rollers 20, 22 and heating platen 18, from their operating positions to their release positions.

When locked, the releasable locking mechanism locks the handle and pressure rollers and heating platen in their operating positions by locking the first and second pivoting linkage mechanisms 28, 30 in their operating positions. The releasable locking mechanism includes a lock down mechanism or means 90 and a hook-catch mechanism or means 92.

Lock down mechanism 90 includes a pair of first and second pivot arms 94, 96 (referred to in the claims herein as third and fourth pivot arms, respectively) each of which has first and second ends (not numbered). As illustrated in FIGS. 3 and 4, the first ends of pivot arms 94 are pivotally connected to pivot arms 62 about an axis Z proximate the ends of pivot arms 62 which include extension members 114 (described in further detail below) which are attached to mounting brackets 64 for pressure rollers 20, 22. The second ends of pivot arms 94 which include roller pressure adjusters 97 are pivotally attached to the first ends of pivot arms 96 about an axis Y. The second ends of pivot arms 96 are pivotally connected to pivot arms 60 about an axis X proximate the pivot arms 60 point of pivotal attachment to handle sides 50. Pivot arms 94 and 96 are dimensioned and pivotally attached to each other and to arms 60, 62 so that a lock down bar 98 connected at its ends to the pivotal connections of pivot arms 94 and 96 is capable of being hookingly engaging by the previously mentioned hook-catch means, the details of which are described immediately below. Roller pressure adjusters 97 enable one to adjust the roller's pressure on sheet 12 against the heating platen.

The hook-catch means (not numbered) cooperates with the second handle crossbar 58 to releasably lock lockdown bar 98 against crossbar 58 to lock the handle and the first and second pivoting linkage means 28, 30 in their operating positions. The hook-catch means includes a pair of semi-S-shaped grasping members 100 which are pivotally attached at their mid-sections to second handle crossbar 58. Grasping members 100 also have first ends 102 and L-shaped ends 104. L-shaped ends 104 are shaped to catch or grab lock lockdown bar 98 and lock it against second handle crossbar 58. The hook-catch means also includes a pair of first and second extension members 106, 108 respectively, each of which has first and second ends (not numbered). Grasping members 100 are pivotally attached at their ends 102 to the first ends of first extension members 106. The other or second ends of extension members 106 are pivotally attached to the first ends of second extension members 108. The second ends of second extension members 108 are pivotally attached to upper handle sides 52 near or proximate the first handle crossbar 56, as illustrated. In addition, the pivotal connections joining first and second extension members 106, 108 are connected to each other by a release bar 110. Grasping members 100 and first and second extension members 106, 108 cooperate with each other and are pivotally connected to handle sides 50, 52 so that release bar 110 is positioned parallel to first handle crossbar 56 and capable of being pulled against crossbar 56 when crossbar 56 and release bar 110 are grasped together by the operator. If the operator grasps release bar 110 and first crossbar 56 together when handle 26 is in its operating position, the L-shaped ends 104 of the grasping members will grab lockdown bar 98 and lock it against crossbar 58, thereby locking the first and second pivoting linkage means 28, 30 in their operating positions which, in turn, locks device 10 in its operating position. As such, pressure rollers 20, 22 are locked in a position where they can apply uniform pressure to sheet 12 against heating platen 18. Grasping members 100 and first and second extension members 106, 108 are also designed to cooperate with handle 26 so that when the operator releases his grasp on the first crossbar 56 and release bar 110, or lightly pushes downwardly on release bar 110, release bar 110 drops or falls under the action of gravity, thereby unlocking the hook catch mechanism. This permits the handle to fall which, in turn, moves the first and second pivoting linkage mechanisms 28, 30 from their operating positions to their release positions. This also causes the push-away bar 80 to move from its vertical position illustrated in FIG. 3 to its push-away or release position illustrated in FIG. 4 in which it is pushing or holding sheet 12 away from and out of contact with heating platen 18.

While not previously described, heating platen 18 has an additional heating surface 112 which pivots into a position in close proximity with supported base surface 16 when apparatus 10 is moved from its release position to its operating position (See FIG. 3). Those skilled in the art will appreciate that heating surface 112 heats base surface 16 as device 10 is pulled by an operator in the direction of the arrow of FIG. 1. The heating of surface 16 (which is usually a supported base sheet 16 of sheet material itself as illustrated) serves to enhance bonding of top sheet 12 to sheet 16. It will also be appreciated that heating platen 18 is provided with a wedge shape which locates or positions heating surface 112 not only close to base sheet 16, but also close to the intersection or point at which top sheet 12 first makes contact with base sheet 16. This area is referred to herein as the envelope and as defined herein envelope includes the surfaces of sheets 12 and 16 near their intersection and the area or gap located therebetween which is identified by the letter M in FIG. 3. The wedge-like shape of heating platen 18 is important in that it facilitates high temperature heating of the envelope which enables the platen to heat top sheet 12 at the point where it makes contact with base sheet 16. The ability to heat top sheet 12 at its point of contact with base sheet 16 is particularly important where one has previously stopped the welding process for some reason (or begins welding against a prior weld as is described below), which causes the sheet material in the area of envelope M to cool. It is important because when one starts the welding process again, the entire area of envelope M must be reheated so that a continuous, uninterrupted weld is produced between the top sheet and base sheet along the entire length of the top sheet. The production of an uninterrupted weld is important, quite obviously, for bond integrity.

As also illustrated, the end of heating platen 18 opposite its surface 112 is preferably provided with insulation 113 to contain the smoke generated by heating sheet 12 and direct it along the width of sheet 12 to the sheet's side edges which, quite obviously, are located on the sides of device 10. By directing the smoke out through the sheet's sides, it will be easier to collect the smoke if such is desired or required by government regulations. The smoke could be directed into a filter means of some sort (not shown) which could be located on each side of the device in a location suitable for collecting the smoke.

While not previously described, it can be seen in FIG. 2 that device 10 is provided with a control box 120 have an electric plug 122 extending therefrom. Box 120 is provided with suitable controls for electrically controlling the temperature of heating platen 18. Control Box 120 could also be outfitted with speed controls for driving a motor (not shown) for propelling a set of wheels 36. A microprocessor could also cooperatively control both the temperature of the heating platen and the speed at which the device is propelled to optimally heat sheet 12. The microprocessor would also preferably be programmed so that device 10 could automatically heat and apply different types of sheet material having different flash points at pre-programmed optimum speeds.

FIG. 5 illustrates that the second end of pivot arm 62, i.e. the end attached to brackets 64 for rotatively mounting rollers 20, 22 actually comprises a pivoting extension member 114 which is attached to the second end of pivot arm 62 and capable of being extended so as to extend the length of pivot arm 62. FIG. 5 also illustrates that extension member 114 is capable of being untightened relative to pivot arm 62 and slid outwardly therefrom to a point where it can be pivoted upwardly in a counterclockwise direction to its position illustrated in FIG. 5. When member 114 is pivoted to this position, a new roll 14 of sheet material can be loaded into the apparatus. This position also makes it extremely easy to load an inner unrolled or interior section of scrolled or unrolled sheet material into the apparatus. As used herein, the loading of an "inner section" of sheet material means loading an unrolled inner or interior section of sheet material between the heating platen and the rollers without having to feed an end edge of the sheet material through the apparatus. "Inner" or interior means any section of sheet material located between its end edges. As such, those skilled in the art will appreciate that the center unrolled section of scrolled sheet material, i.e., the unrolled section joining the two scrolled sections of scrolled material can be loaded into the apparatus without having to unroll a scrolled section and feed its exposed end edge through the apparatus to load it. As such, those skilled in the art will appreciate that scrolled sheet material can be welded from its unrolled inner section outwardly to either end edge.

To load the inner section of scrolled sheet material into the apparatus, one first pivots extension members 114 upwardly so that rollers 20, 22 are in their loading position illustrated in FIG. 5. One then inserts support bar 48 through the core of one of the scrolled sections. This scrolled section is then placed on support brackets 44 with ends of bar 48 resting in "V" notches 46. Note that extension members 114 can be slid outwardly to a position which enables a wide roll of material to be placed in the loaded position as described above. After loading the roll, pivoting extension members can be pivoted downwardly and slid inwardly to position rollers 20, 22 back into their release position illustrated in FIG. 4. Device 10 can then be moved from its release position to its operating position illustrated in FIG. 3 in which the sheet material is pressed by rollers 20, 22 against heating platen 18. This loaded scrolled section can then be welded to the base surface by propelling the device 10 in the direction of the arrow of FIG. 1 which applies the loaded section to the base surface. After welding this half, the other scrolled section can be loaded into device 10 and welded to the base surface in a similar fashion. The wedge shape of the platen enables one to locate surface 112 of the platen into the area adjacent the weld which was formed when welding of the first scrolled section began. As previously described, the heating of this area will produce a continuous, uninterrupted weld between the two scrolled sections.

FIG. 6 also illustrates that device 10 is preferably provided with a guide pin 130 which can be moved laterally along a slot 132 illustrated in FIG. 6. When properly adjusted, an operator observing guide pin can keep device 10 properly aligned so that the plyline of sheet 12 is properly aligned with either a lapped adjoining sheet or another reference. An operator does this by keeping guide pin aligned with the sheet's plyline as he or she propels or pulls device 10 in the direction of the arrow indicated in FIG. 1.

From the above description, those skilled in the art will appreciate that the present invention not only provides an apparatus which is capable of heating and applying sheet material to an supported surface, but also provides an apparatus which is capable of preventing the sheet material from overheating which can occur when an operator stops pulling the welding apparatus, thereby stopping the welding process. The novel release mechanism described above prevents such overheating which can occur even if the operator temporarily stops pulling the apparatus since it can be easily activated. The apparatus of the present invention also enables an supported layer of sheet material to be heated so that a better bond or weld is formed between the underlying layer and the sheet applied by the welding apparatus. In addition, those skilled in the art will appreciate that the present device can be constructed out of relatively lightweight material, is easily transported and is relatively inexpensive when compared to other commercially available welding devices.

The invention has been described in detail with reference to a particular embodiment thereof, but it will be understood that various other modifications can be effected within the spirit and scope of this invention.

What is claimed is:

1. A method for heating and applying sheet material to a supported base surface which prevents overheating of the sheet material, said method comprising the steps of;
   providing a welding apparatus including;
      mobile frame means for supporting a roll of sheet material and permitting the roll to be unrolled;
      a moveable heating platen for heating the sheet material along its width when said heating platen is in its heating operating position;
      moveable pressure means for pressing the sheet material against said heating platen when said moveable pressure means is in its heating operating position and said moveable heating platen is in its heating operating position, the pressing of the sheet material against said heating platen facilitating heating of the sheet material; and
      release means cooperating with said moveable heating platen and said pressure means for moving said heating platen and said pressure means in unison to and from their heating operating positions and their release positions, said heating platen and said pressure means being sufficiently space from each other when they are in their release positions so that a sheet of material located therebetween is prevented from contacting and being heated by said heating platen;
   loading sheet material into the welding apparatus;
   heating the sheet material along its width to a temperature which enables it to bond to the supported base surface by passing it between the heating platen and the pressure means of the welding apparatus when the pressure means is pressing the sheet material against the heating platen;
   applying the sheet material to the supported base surface so that it bonds thereto; and
   separating the sheet of material from the heating platen by moving the heating platen in unison with [relative to]the pressure means so that the sheet material is prevented from contacting and being overheated by the heating platen 2. A method as claimed in claim 1 further comprising heating the supported base surface to enhance bonding of the sheet material to the supported surface.

3. A method as claimed in claim 2 wherein the base surface includes a layer of sheet material which is heated by the welding apparatus and bonded to the sheet material being applied by the welding apparatus.

4. A method as claimed in claim 1 wherein an inner, unrolled section of the sheet material is loaded into the welding apparatus to enable the welding process to be carried out by welding the sheet material from the inner, unrolled section outwardly to an outer end edge of the sheet material.

5. A method as claimed in claim 1 further comprising a step of directing smoke generated by heating the sheet material to the sides of the apparatus.

6. A method as claimed in claim 5 further comprising a step of collecting smoke having been directed to the sides of the apparatus.

7. An apparatus for heating and applying sheet material in a rolled or unrolled form to a supported base surface which prevents overheating of the sheet material, said apparatus comprising;
   mobile frame means for transporting, supporting and permitting a roll of sheet material to be unrolled:
   a heating platen for heating the sheet material along its width;
   pressure means for pressing the sheet material against said heating platen to facilitate heating of the sheet material; and
   release means for moving said heating platen relative to said pressure means so that a sheet of material located therebetween is prevented from contacting and being overheated by said heating platen, said release means including:
      a handle; and
      pivoting linkage means connected to said handle and to one of said heating platen and said pressure means for cooperating therewith to move said heating platen relative to said pressure means when said handle means moves relative thereto, said handle having an operating position wherein said pressure means presses the sheet material against said heating platen to facilitate heating of the sheet material, said handle also having a release position wherein said heating platen is sufficiently spaced from said pressure means so that a sheet of material located therebetween is prevented from contacting and being overheated by said heating platen.

8. An apparatus as claimed in claim 7 wherein said heating platen is moveable between an operating position and a release position and wherein said pressure means is moveable between an operating position and a release position.

9. An apparatus as claimed in claim 8 wherein said pressure means and heating platen move in unison as said handle moves to and from its release position and operating position, said heating platen and said pressure means being positioned relative to each other when they are in their operating positions so that a sheet of material located therebetween is pressed against said heating platen to facilitate its heating, said heating platen also being located proximate the supported base surface when it is in its operating position to facilitate heating of the base surface so that sheet material being applied to the base surface is capable of welding thereto.

10. An apparatus as claimed in claim 7 wherein said release means includes a push-away bar means for pushing the sheet material away from said heating platen when said heating platen and said pressure means are moved from their operating positions to their release positions.

11. An apparatus as claimed in claim 7 further comprising releasable locking means for releasably locking said pressure means against said heating platen to facilitate heating of the sheet material.

12. An apparatus as claimed in claim 7 wherein said mobile frame means further comprises wheels for enabling said apparatus to be rolled on a base surface.

13. An apparatus as claimed in claim 7 wherein said heating platen is provided with a wedge-like shape so that a portion of said heating platen extends into the area between the underside surface of the sheet being applied by said apparatus and the base surface to enable heating of the sheet at the point where it contacts the base surface.

14. An apparatus as claimed in claim 12 further comprising motor means for driving said wheels to propel said apparatus.

15. An apparatus for heating and applying sheet material to a base surface which prevents overheating of the sheet material, said apparatus comprising;
mobile frame means for supporting a roll of sheet material and permitting the roll to be unrolled;
a moveable heating platen for heating the sheet material along its width when said heating platen is in its heating operating position;
moveable pressure means for pressing the sheet material against said heating platen when said moveable pressure means is in its heating operating position and said moveable heating platen is in its heating operating position, the pressing of the sheet material against said heating platen facilitating heating of the sheet material; and
release means cooperating with said moveable heating platen and said pressure means for moving said heating platen and said pressure means in unison to and from their heating operating positions and their release positions, said heating platen and said pressure means being sufficiently spaced from each other when they are in their release positions so that a sheet of material located therebetween is prevented from contacting and being heated by said heating platen.

16. An apparatus as claimed in claim 15 wherein said release means includes:
a handle having a pair of sides having lower ends with rigidly attached pivot rods for pivotally attaching said handle to opposite sides of said frame means about a first fixed axis, said handle also including a first handle crossbar for grasping by an operator which connects the upper ends of said handle sides;
first pivoting linkage means for moving said pressure means to and from its operating and release positions including:
a pair of first and second pivot arms, each of which has first and second ends, said first pivot arms being pivotally connected at their first ends to the mid-sections of said handle sides about a first floating axis, the second ends of said first pivot arms being connected pivotally to the first ends of said second pivot arms about a second floating axis, the second ends of said second pivot arms being connected to opposite ends of said pressure means, said second pivot arms also being pivotally attached at their mid-sections to said frame means about a second fixed axis, said handle, said first and second pivot arms being dimensioned and cooperating with said handle so that said pressure means pivots into alignment with said heating platen when said handle is moved from its release position to its operating position; and
second pivoting linkage means for moving said heating platen to and from its operating and release positions including:
a pair of first, second and third links, all of which have first and second ends, said first links having their first ends rigidly attached to said pivot rods of said handle so that said first links are capable of being pivoted about the first fixed axis when said handle is moved between its operating and release positions, the second ends of said first links being pivotally attached to the first ends of said second links about a third floating axis, the second ends of said second links being pivotally attached to the first ends of said third links about a fourth floating axis, said third links being rigidly attached to the opposite ends of said heating platen, the second ends of said third links being pivotally attached to said frame means about a third fixed axis, said first, second and third links having predetermined dimensions and cooperating so that said heating platen pivots to and from its release and operating positions about the third fixed axis as said handle is moved to and from its release and operating positions.

17. An apparatus as claimed in claim 16 further comprising releasable locking means for locking said handle, said first pivoting linkage means and said second pivoting linkage means in their operating positions.

18. An apparatus as claimed in claim 17 wherein said releasable locking means includes:
hook catch means and lock down means, said hook catch means being pivotally attached to said handle, said lock down means being pivotally attached to said first pivoting linkage means, said hook catch means being capable of hookingly catching said lock down means to lock said handle to said first pivoting linkage means so that said handle, said first pivoting linkage means and said second pivoting linkage means are locked in their operating positions, said hook catch means also capable of being released from said first pivoting linkage means so that said handle, said first pivoting linkage means and said second pivoting linkage means are capable of moving to their release positions from their operating positions.

19. An apparatus as claimed in claim 17 further comprising releasable locking means for locking said handle, said first pivoting linkage means and said second pivoting linkage means in their operating positions, said handle having a second handle crossbar parallel to said first handle crossbar, said second handle cross-bar being connected at its ends to said handle sides, said releasable locking means including hook catch means and lock down means;

said lock down means including a pair of third arms and fourth pivot arms each of which has first and second ends, the first ends of said third arms being pivotally connected to said second pivot arms proximate the second ends of said second pivot arms which are attached to said pressure means, the second ends of said third pivot arms being pivotally connected to the first ends of said fourth pivot arms, the second ends of said fourth pivot arms being pivotally connected to said first pivot arms proximate the first ends of said first pivot arms which are pivotally attached to said handle sides, said third and fourth pivot arms being dimensioned and cooperating with said first and second arms so that a lock down bar connected at its ends to the pivotal connections of each pair of said third and fourth arms is capable of being hookingly engaged by said hook catch means;

said hook catch means cooperating with said second handle crossbar for releasably locking said lock down bar against said second crossbar to lock said handle, said first and second pivoting linkage means in their operating positions, said hook catch means including a pair of grasping members which are pivotally attached at their midsections to said second handle crossbar and which have first ends and L-shaped ends, said L-shaped ends being shaped to lock said lock down bar against said second handle crossbar, said hook catch means also including a pair of first and second extension means having first and second ends, said grasping members being pivotally attached at their first ends to the first ends of said first extension members, the second ends of said first extension members being pivotally connected to the first ends of second extension members, the second ends of said second extension members being pivotally connected to said handle sides proximate said first handle crossbar, the pivotal connections joining said first and second extension members being connected to each other by a release bar, said grasping members and said first and second extension members cooperating so that said release bar is parallel to and capable of being located against said first handle crossbar such that when said first handle crossbar and said release bar are grasped together by an operator and said handle is in its operating position, said first and second pivoting linkage means will be locked in their operating positions and such that when the operator releases his grasp on said first handle crossbar and said release bar, said release bar will drop due to the action of gravity thereby unlocking said catch means to permit the handle and said first and second pivoting linkage means to move from their operating positions to their release positions.

20. An apparatus as claimed in claim 15 further comprising sheet loading means for moving said pressure means from its release position to a sheet loading position in which an inner, unrolled section of a length of sheet material can be loaded into said apparatus without having to feed an end edge of the sheet material through said apparatus.

21. An apparatus as claimed in claim 16 further comprising sheet loading means for moving said pressure means from its release position to a loading position so that an inner, unrolled section of a length of sheet material can be loaded into said apparatus without having to feed an end edge of the sheet material through said apparatus, said sheet loading means including a pair of pivoting extension members pivotally attached at one of their ends to said second ends of said pivot arms and at their other ends to said pressure means, said extension members enabling said pressure means to be moved between its release and loading positions.

22. An apparatus as claimed in claim 16 wherein said pair of handle sides define a pair of upper handle sides and a pair of lower handle sides, said upper handle sides being pivotally connected at their lower ends to the upper end of said lower handle sides, said apparatus further including a locking mechanism for locking at least one of the upper and lower pivotally connected handle sides at their pivotal connection, the locking pivotal connection enabling said pair of upper handle sides to be pivoted upwardly to and locked in an upright position when said handle is in its release position so that said device is more easily transported and stored.

23. An apparatus for heating and applying sheet material to a base surface which prevents overheating of the sheet material, said apparatus also heating the supported base surface to which the sheet material is applied to facilitate bonding or welding of the sheet material to the base surface, said apparatus comprising;

mobile frame means for transporting, supporting and permitting a roll of sheet material to be unrolled;

a heating platen for heating the sheet material along its width and for heating a supported base surface to which the sheet material is to be applied;

pressure means for pressing the sheet material against the heating platen to facilitate heating of the sheet material; and release means for moving said heating platen relative to said pressure means so that a sheet of material located therebetween is prevented from contacting and being overheated by said heating plate, said release means also moving said heating platen relative to said frame means so that the supported base surface is prevented from overheating, said release means including;

a handle for moving between an operating and a release position;

first pivoting linkage means attached to said handle and said pressure means for moving said pressure means to and from an operating position and a release position as said handle moves to and from its operating and release positions; and second pivoting linkage means attached to said handle and said heating platen for moving said heating platen to and from an operating position and a release position as said handle moves to and from its operating and release positions.

24. An apparatus for heating and applying sheet material in a rolled or unrolled form to a supported base surface which prevents overheating of the sheet material, said apparatus comprising;

mobile frame means for transporting, supporting and permitting a roll of sheet material to be unrolled;

a heating platen for heating the sheet material along its width;

pressure means for pressing the sheet material against said heating platen to facilitate heating of the sheet material;

release means for moving said heating platen relative to said pressure means so that a sheet of material located therebetween is prevented from contacting and being overheated by said heating platen; and sheet loading means for moving said pressure means to and from a sheet loading position so that when said pressure means is in the sheet loading position an inner, unrolled section of a length of sheet material can be loaded into said apparatus without having to feed an end edge of the sheet material through said apparatus.

* * * * *